United States Patent
Betting et al.

(10) Patent No.: US 8,105,422 B2
(45) Date of Patent: Jan. 31, 2012

(54) CYCLONIC LIQUID DEGASSING SEPARATOR AND METHOD FOR DEGASSING A FLUID MIXTURE

(75) Inventors: Marco Betting, Rijswijk (NL); Bart Prast, Rijswijk (NL); Helmar Van Santen, Amsterdam (NL); Cornelius Johannes Schellekens, Amsterdam (NL); Paulus Henricus Joannes Verbeek, Rijswijk (NL); Peter Mervyn Wilkinson, Amsterdam (NL)

(73) Assignee: Shell Oil Company, Houston, TX (US)

( * ) Notice: Subject to any disclaimer, the term of this patent is extended or adjusted under 35 U.S.C. 154(b) by 378 days.

(21) Appl. No.: 12/306,539

(22) PCT Filed: Jun. 27, 2007

(86) PCT No.: PCT/EP2007/056392
§ 371 (c)(1),
(2), (4) Date: Dec. 24, 2008

(87) PCT Pub. No.: WO2008/000753
PCT Pub. Date: Jan. 3, 2008

(65) Prior Publication Data
US 2009/0205488 A1    Aug. 20, 2009

(30) Foreign Application Priority Data
Jun. 29, 2006  (EP) .................................... 06116360

(51) Int. Cl.
B01D 19/00    (2006.01)
(52) U.S. Cl. .................. 95/261; 95/30; 96/195; 96/175
(58) Field of Classification Search .................... 95/261, 95/30; 96/195, 184, 175
See application file for complete search history.

(56) References Cited

U.S. PATENT DOCUMENTS

| 2,811,219 | A | 10/1957 | Wenzl | 183/2.5 |
| 4,596,586 | A | 6/1986 | Davies et al. | 55/52 |
| 5,064,448 | A | 11/1991 | Choi | 55/38 |
| 6,402,799 | B1 | 6/2002 | Kokubo et al. | 55/396 |

(Continued)

FOREIGN PATENT DOCUMENTS

| DE | 3715157 | 11/1988 |
| EP | 1443026 | 8/2004 |

(Continued)

OTHER PUBLICATIONS

International Search Report dated Oct. 8, 2007 (PCT/EP2007/056392).

*Primary Examiner* — Duane Smith
*Assistant Examiner* — Douglas Theisen

(57) ABSTRACT

The invention is a method and cyclonic separator for degassing a fluid mixture comprising a carrier liquid and gaseous or vaporizable components. In this method, the fluid mixture is accelerated in a throat section of a vortex tube such that the static pressure of the fluid mixture is decreased and vaporizable components evaporate into a gaseous phase and the fluid mixture flows as a substantially homogeneously dispersed gas-liquid mixture through the throat section; the accelerated fluid mixture is induced to swirl within a tubular mid section of the vortex tube such that the fluid mixture is separated by centrifugal forces into a degassed liquid fraction and a gas enriched fraction; the degassed liquid fraction is induced to flow into an annular liquid outlet conduit; and the gas enriched fraction is induced to flow into a central gas outlet conduit.

23 Claims, 2 Drawing Sheets

U.S. PATENT DOCUMENTS

| | | | |
|---|---|---|---|
| 6,517,732 B1 | 2/2003 | Brockoff et al. | 210/782 |
| 6,730,214 B2 * | 5/2004 | Mazzei | 210/188 |
| 2005/0120879 A1 | 6/2005 | Joynson et al. | 95/261 |

FOREIGN PATENT DOCUMENTS

| | | |
|---|---|---|
| GB | 2035150 | 6/1980 |
| WO | WO9901194 | 1/1999 |
| WO | WO03002227 | 1/2003 |
| WO | WO03029739 | 4/2003 |
| WO | WO03055575 | 7/2003 |
| WO | WO03092850 | 11/2003 |
| WO | WO2006070019 | 7/2006 |

* cited by examiner

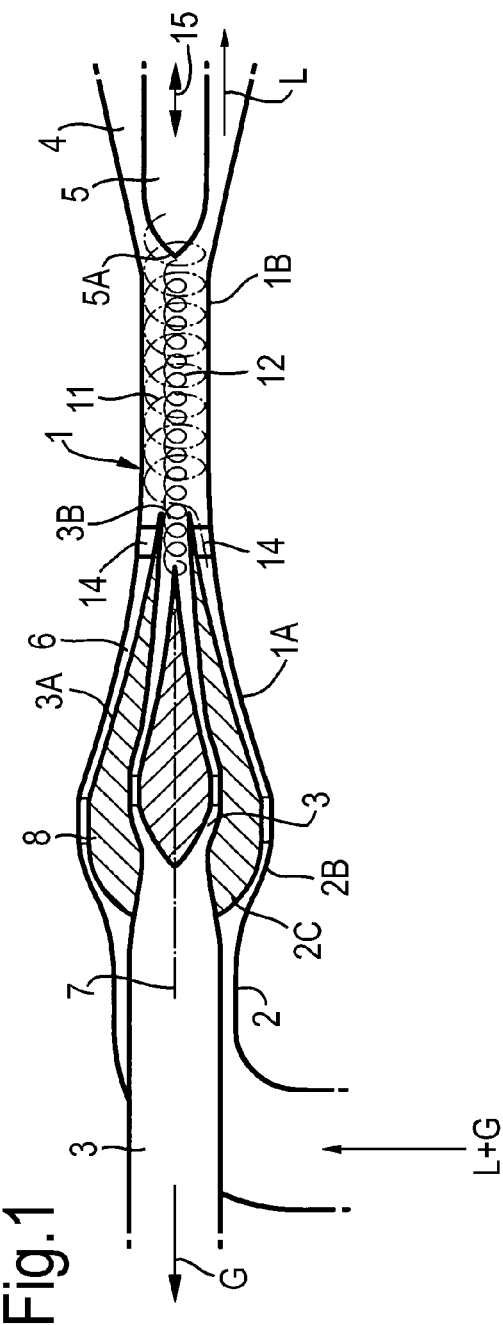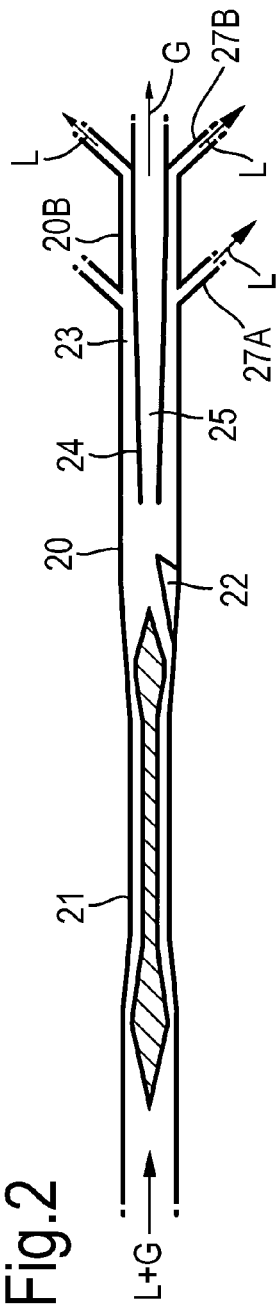

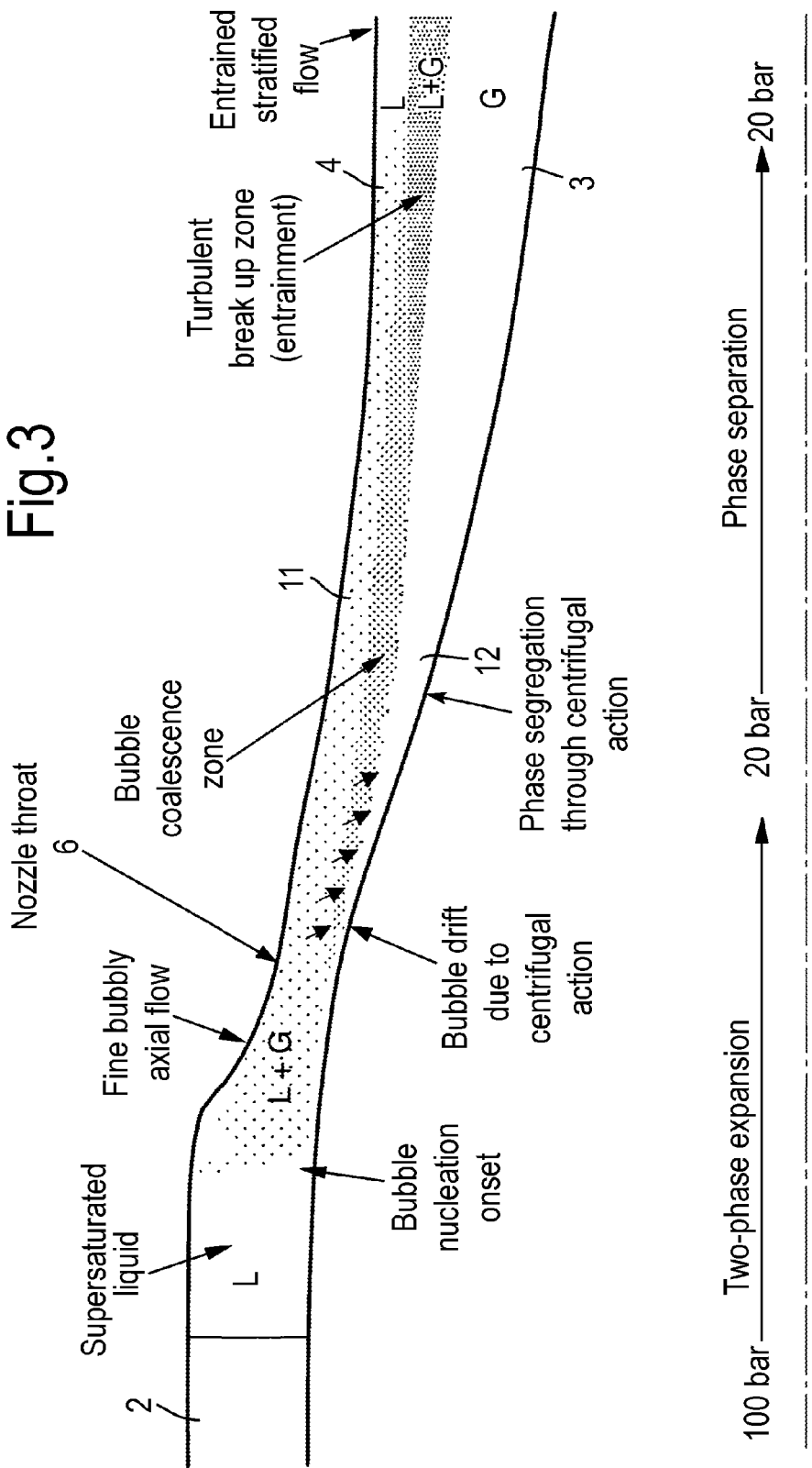

CYCLONIC LIQUID DEGASSING SEPARATOR AND METHOD FOR DEGASSING A FLUID MIXTURE

PRIORITY CLAIM

The present application claims priority of European Patent Application No. 06116360.6 filed 29 Jun. 2006.

FIELD OF THE INVENTION

The invention relates to a cyclonic separator and method for degassing a fluid mixture.

BACKGROUND OF THE INVENTION

U.S. Pat. No. 6,402,799 discloses a cyclonic separator in which a gas-liquid mixture is injected via a tangential inlet into a horizontal vortex tube in which the gaseous and liquid fractions are at least partly separated and the liquid fraction forms a film alongside the inner wall of the vortex tube and is discharged via a radial outlet, whereas the gaseous fraction is concentrated near the central axis of the vortex tube and discharged via a central outlet.

International patent applications WO9901194 and WO03029739 disclose cyclonic separators wherein a gas stream is accelerated in a vortex tube to a near sonic or supersonic velocity and thereby expanded and adiabatically cooled such that liquid or solid particles are formed which are discharged via an outlet at the outer circumference of the tube, whereas a dry gas fraction is discharged via a central outlet. These known separators are configured to remove liquefied and/or solidified components from a gas stream and not to remove a gaseous fraction from a carrier liquid.

International patent application WO03/002227 discloses a hydrocyclone for removing air from a high viscosity carrier liquid.

UK patent GB2035150; U.S. Pat. Nos. 2,811,219 and 4,596,586 and International patent application WO03055575 disclose cyclonic separators in which a gas-liquid mixture is injected via a tangential inlet into a vertical vortex tube which has at its upper end a central gas outlet conduit via which the gaseous fraction is discharged and at its lower end a liquid collecting basin which is connected to a liquid discharge conduit.

A disadvantage of the latter group of known cyclonic separators is that they generally are large pieces of equipment and have a limited separation efficiency.

The method according to the preamble of claim 1 and the separator according to the preamble of claim 14 are known from U.S. Pat. No. 6,517,732, which discloses a method of removal of air from blood in a cyclonic device in which first a swirling motion is imposed on the blood-air mixture by helical grooves (24) and the swirling mixture is subsequently accelerated in a nozzle and then separated.

A disadvantage of the known method is that the swirling motion induced by the helical grooves (24) induces dehomogenisation of the fluid mixture by centrifugal forces. Such dehomogenisation before the nozzle reduces the separation performance of the device.

It is an object of the present invention to provide a compact cyclonic separator for degassing a fluid mixture and an efficient method for degassing a fluid mixture.

It is a further object of the present invention to provide a cyclonic separator for degassing a fluid mixture in which a large gas fraction is separated from a carrier liquid.

SUMMARY OF THE INVENTION

In accordance with the invention there is provided a method for degassing a fluid mixture comprising a carrier liquid and one or more gaseous and/or vaporizable components in a cyclonic separator in which:
- the fluid mixture is accelerated in a throat section of a vortex tube such that the static pressure of the fluid mixture is decreased and vaporizable components evaporate into a gaseous phase;
- the accelerated fluid mixture is induced to swirl within the vortex tube such that the fluid mixture is separated by centrifugal forces into a degassed liquid fraction and a gas enriched fraction;
- the degassed liquid fraction is induced to flow into a liquid outlet conduit which is located at or near the outer circumference of the vortex tube;
- the gas enriched fraction is induced to flow into a gas outlet conduit which is located at or near a central axis of the vortex tube; and
- the fluid mixture is induced to flow as a substantially homogeneously dispersed gas-liquid mixture through the throat section.

An advantage of homogenizing the gas-liquid mixture is that the speed of sound in such a homogenized mixture is lower than in an inhomogeneous mixture. The speed of sound in a substantially homogeneous gas-liquid mixture may be less than 300 m/s.

To homogenize the mixture the gas-liquid mixture may be induced to flow in a substantially turbulent flow regime and in a substantially axial direction relative to a central axis of the throat section.

Optionally, one or more flow straightening vanes are arranged in the annular space, which vanes induce the gas-liquid mixture to flow in a substantially axial direction through the annular throat section.

Furthermore a substantially inert gas may be injected into the gas-liquid mixture to enhance homogenization of the gas-liquid mixture.

In an embodiment of the method according to the invention:
- the degassed liquid is induced by one or more wings arranged in the vortex tube downstream of the throat section to flow in a swirling motion along the inner surface of the vortex tube in downstream direction from a proximal end towards a distal end of the vortex tube and is discharged via an annular liquid outlet conduit which is arranged co-axially between a bullet-shaped deflection body and the inner surface of the distal end of the vortex tube; and
- the gas enriched fraction is induced to flow in a counter-current swirling motion from a nose section of the bullet-shaped deflection body towards the gas outlet conduit which is arranged co-axially within the proximal end of the vortex tube.

The bullet-shaped deflection body may have a conical nose section and a substantially cylindrical tail section, and the distal end of the vortex tube may have an in downstream direction diverging shape.

The central gas outlet conduit may be co-axially arranged around a torpedo-shaped central body having conical nose and tail sections and a substantially cylindrical mid section; and
- the gas enriched fraction in the central gas outlet conduit may be deswirled by an assembly of flow deswirling vanes which is arranged in the central gas outlet conduit between the outer surface of the central body and the inner surface of the wall of the central gas outlet conduit. The liquid in the liquid outlet may be deswirled in a similar manner.

In an alternative embodiment of the method according to the invention the vortex tube has a trumpet-shaped proximal end which is connected to a fluid inlet tube, such that an annular fluid inlet conduit is formed which co-axially surrounds the wall of the central gas outlet conduit and in which a series of flow-straightening vanes are arranged which induce the fluid mixture to flow in a substantially axial direction into the vortex tube.

The flow-straightening vanes may be arranged in a section of the annular fluid inlet conduit in which the fluid inlet tube has a larger inner diameter than other parts of the fluid inlet tube which vanes induce the fluid mixture to flow at a subsonic velocity through the annular fluid inlet conduit and the gas-liquid mixture may be accelerated to a substantially transonic or supersonic velocity in the trumpet-shaped proximal end of the vortex tube.

Optionally, the gas-liquid mixture comprises crude oil as a carrier liquid and the gaseous and/or vaporizable components comprise natural gas and/or condensates such as methane, ethane, propane, butane and pentane, carbon dioxide and/or hydrogen sulfide.

In accordance with the invention there is further provided a cyclonic liquid degassing separator for degassing a fluid mixture comprising a carrier liquid and one or more gaseous and/or vaporizable components, comprising:

a vortex tube having a throat section in which the fluid mixture is accelerated such that the static pressure of the fluid mixture is decreased and vaporizable components evaporate into a gaseous phase;

one or more swirl imparting vanes for inducing the fluid mixture to swirl within the vortex tube thereby inducing the mixture to be separated by centrifugal forces into a degassed liquid fraction and a gas enriched fraction;

a degassed liquid outlet conduit which is located at or near the outer circumference of the vortex tube for discharging the degassed liquid fraction; and a gas outlet conduit which is located at or near a central axis of the vortex tube for discharging the gas enriched fraction characterized in that the separator further comprises fluid homogenization means for inducing the fluid mixture to flow as a substantially homogeneously dispersed gas-liquid mixture through the throat section.

Optionally, said fluid homogenization means comprise turbulence generating means which are configured to induce the gas-liquid mixture to flow in a substantially turbulent flow regime and in a substantially axial direction relative to a central axis of the throat section.

It is observed that in a substantially homogeneous gas-liquid mixture the sound velocity is lower than in a pure gas or a pure liquid. The sound velocity in pure gas may be about 340 m/s and the sound velocity in a pure liquid may be about 1000 m/s, whereas the sound velocity in a substantially homogeneous gas/liquid mixture may be about 50 m/s.

In accordance with the invention the gas-liquid mixture is maintained substantially homogeneously dispersed when the mixture is accelerated to a supersonic velocity whilst the sonic velocity is low, in particular lower than 300 m/s.

When used in this specification and claims the following terms shall have the following meanings.

A substantially homogenously dispersed gas-liquid mixture comprises a carrier liquid in which gaseous bubbles are dispersed such that the number density of bubbles/droplets is substantially invariant throughout the flow cross section of a conduit through which the fluid flows, while the mean diameter of the bubble/droplet is at most 100 micron.

A substantially inert gas is a gas which does not react with the fluid mixture flowing through the separator, such as Helium, Argon, Carbon Dioxide and/or vaporized steam.

These and other features and embodiments of the method and cyclonic separator according to the invention are described in the accompanying claims, abstract and following detailed description in which reference is made to the accompanying drawings.

BRIEF DESCRIPTION OF THE DRAWINGS

FIG. 1 depicts a schematic longitudinal sectional view of a first embodiment of a cyclonic liquid degassing separator according to the invention in which a fluid mixture is degassed and separated and separated the degassed liquid fraction L and the gaseous fraction G are discharged at opposite ends of the separator;

FIG. 2 depicts a schematic longitudinal sectional view of a second embodiment of a cyclonic liquid degassing separator according to the invention in which a fluid mixture is degassed and separated and the degassed liquid fraction L and the gaseous fraction G are both discharged at the same end of the separator; and FIG. 3 shows expected flow regimes and pressures in different parts of the cyclonic liquid degassing separator according to the invention.

DETAILED DESCRIPTION OF EMBODIMENTS OF THE INVENTION

FIG. 1 depicts a cyclonic liquid degassing separator, which comprises a vortex tube 1, an untreated fluid inlet conduit 2, a gas outlet conduit 3 and a degassed liquid outlet conduit 4.

The vortex tube 1 has a trumpet-shaped proximal end 1A and a diverging distal end 1B.

The liquid outlet conduit 4 is formed by an annular space between the inner surface of the diverging distal end 1B of the vortex tube 1 and a bullet-shaped deflection body 5.

The trumpet-shaped proximal end 1A of the vortex tube 1 is connected to the diverging outer wall 2B of the fluid inlet conduit 2.

A series of flow straightening vanes 8 is arranged in the diverging annular end-section 2C of the inlet conduit 2, which vanes 8 induce the untreated fluid mixture to flow in a substantial axial direction relative to a central axis 7 of the separator, which vanes 8 inhibit swirling of the fluid mixture relative to the central axis 7 in an annular throat section 6 formed between the inner surface of the trumpet-shaped proximal end 1A of the vortex tube 1 and the outer surface of the wall 3A of the gas outlet conduit 3.

The annular throat section 6 has a gradually decreasing cross-sectional area and thus acts as a so-called Laval nozzle in which the fluid mixture is accelerated to a subsonic, or preferably to a transonic or supersonic velocity. In the accelerated fluid mixture the fluid will expand and the static pressure will drop, so that the dissolved gas fraction in the carrier liquid will evaporate and liquid flow is transformed into a bubbly flow of carrier liquid and gas bubbles L+G. Simultaneously, the flow straightening vanes 8 will inhibit a swirling motion of the bubbly flow L+G. One or more swirl imparting vanes 14 are arranged in an annular swirl imparting section of the vortex tube 1, which annular swirl imparting section 1A is arranged downstream of the annular throat section 6. The swirling motion may impose centrifugal forces of 100000 g on the bubbly flow L+G causing the low density gas bubbles G to migrate towards the central axis 7 of the vortex tube 1 and the high density liquid fraction L to migrate towards the tubular inner surface of the vortex tube 1.

The high-density liquid fraction L will spin as an annular film 11 along the tubular inner surface of the vortex tube 1 into the liquid outlet conduit. The gas bubbles G will coalesce and form a continuous gaseous phase near the central axis 7 of the vortex tube 1, which gaseous phase will hit the pointed nose section 5A of the bullet-shaped deflection body 5 which is then deflected and induced to flow as a countercurrent swirl 12 from the pointed nose section 5A in a direction from the distal end 1B towards the proximal end of the vortex tube 1 into the gas outlet conduit 3. The ring-shaped co-axial entrance 3B of the gas outlet conduit 3 will perform as a vortex finder for the gaseous stream G. A torpedo-shaped central body is arranged within the gas outlet conduit 3 and a series of deswirling vanes will deswirl and straighten the gaseous stream G within said conduit 3.

The bullet shaped deflection body 5 can be axially moved within the diverging distal end 1B of the vortex tube, as illustrated by arrow 15, so that the width of the annular liquid outlet conduit 4 and the flow rate of the degassed liquid L can be adjusted.

FIG. 2 depicts an alternative embodiment of the cyclonic liquid degassing separator which comprises a vortex tube 20 having a narrow throat section 21 in which the a fluid mixture of a carrier liquid and dissolved gaseous and/or vaporizable components is accelerated to a near-sonic or supersonic velocity and swirled by one or more swirl imparting vanes 22, so that the vaporizable components evaporate and the high-density liquid fraction L is separated from the low density gaseous fraction G by centrifugal forces. The high-density liquid fraction will form a swirling annular film alongside the inner surface of the vortex tube 20 which is discharged from the vortex tube 20 via an annular outlet conduit 23, which is formed between the inner surface of a distal end 20B of the vortex tube 20 and the outer surface of the wall 24 of a central gas outlet conduit 25 through which the gaseous fraction G is discharged. A series of liquid discharge conduits 27A and 27B is connected to the annular outlet conduit 23, wherein the amount of liquid discharge conduits 27A, 27B is selected such that shear forces between the walls of the annular outlet conduit 23 and the rotating liquid and also between the rotating gas and liquid streams are reduced. The annular outlet conduit 23 and the vortex tube 20 may have rotating walls, thereby further reducing shear forces between the rotating gas and liquid streams. The liquid discharge conduits 27A and 27B may furthermore have a plurality of slit-shaped inlet openings in order to further reduce shear forces between the rotating gas and liquid streams. Optionally the inlet conduits of the cyclonic separators shown in FIGS. 1 and 2 may be provided with a heating coil which reduces the viscosity of the carrier liquid and enhance diffusive transport and/or with a fluid homogenizer, such as a perforated plate, which homogenizes the multiphase fluid mixture into a substantially homogeneously dispersed gas-liquid mixture. The cyclonic separators may further be provided with one or more ultrasonic or other sound transducers, which may be arranged at various locations along the length of the separator and which enhance diffusive transport by creating pressure fluctuations in the expanding fluid mixture.

A gas/liquid gravity separation assembly (not shown) comprising mechanical weirs under and over flow systems may separate the three phases: oil, water and residual gas discharged by the annular outlet conduit 23. The gas pressure equalises the pressure for the three phases and the differences in specific gravity provides the difference in gas/liquid and oil/water levels for separation. The different heights of the weirs traps one of the phases upstream of the weir and another phase will pass under and over the weir.

FIG. 3 is a schematic view of the fluid flow and static pressure reduction in the cyclonic liquid degassing separator according to the invention. It illustrates how in the separator depicted in FIG. 1 the liquid flow is transformed into a fine bubbly flow of a substantially homogeneously dispersed fluid mixture within the throat section 6 and segregated into an annular swirling liquid fraction L and a central counterswirling gas fraction G. The pressure of the injected liquid mixture may be about 100 bar and the pressure of the discharged gaseous fraction in the gas outlet conduit 3 may be about 20 bar.

An advantage of inducing the multiphase fluid mixture to flow as a substantially homogeneously dispersed gas-liquid mixture through the throat section 6,21 of the cyclonic separator is that the sound velocity in a homogeneously dispersed gas-liquid mixture is significantly lower than in an inhomogeneously dispersed gas-liquid mixture. In a multiphase fluid mixture the velocity of sound decreases dramatically relative to the gaseous speed of sound with increasing liquid fraction in the gas. If the speed of sound drops and the fluid mixture velocity remains the same the Mach number of the mixture increases strongly. Now the expansion ratio (P_inlet 2/P_end-throat section 6,21) increases with increasing Mach number hence in a two-phase expansion the fluid only need to be accelerated moderately (such as to about 100 m/s) in order to obtain a substantial pressure reduction (such as a factor 5). In the example shown in FIG. 3 the pressure of the multiphase fluid mixture at the entrance 2 of the cyclonic separator may be about 100 bar, so that the fluid pressure in the throat section 6,21 may be as low as about 20 bar. The deeper the expansion (i.e. the lower the pressure) the larger the driving force will be for degassing the multiphase fluid mixture.

That which is claimed is:

1. A method for degassing a fluid mixture comprising a carrier liquid and one or more gaseous or vaporizable components in a cyclonic separator in which:
    the fluid mixture is accelerated in a throat section of a vortex tube such that the static pressure of the fluid mixture is decreased and vaporizable components evaporate into a gaseous phase;
    the accelerated fluid mixture is induced to swirl within the vortex tube such that the fluid mixture is separated by centrifugal forces into a degassed liquid fraction and a gas enriched fraction;
    the degassed liquid fraction is induced to flow into a liquid outlet conduit which is located at or near the outer circumference of the vortex tube; and
    the gas enriched fraction is induced to flow into a gas outlet conduit which is located at or near a central axis of the vortex tube;
    wherein the fluid mixture is induced to flow as a substantially homogeneously dispersed gas-liquid mixture through the throat section; and
    that one or more flow straightening vanes induce the fluid mixture to flow in a substantially axial direction relative to a central axis of the throat section.

2. The method of claim 1, wherein a speed of sound in the substantially homogeneous gas-liquid mixture is less than 300 m/s.

3. The method of claim 1, wherein the gas-liquid mixture is induced to flow in a substantially turbulent flow regime through the throat section.

4. The method of claim 3, wherein a central body is arranged in the throat section such that the throat section has an annular shape and has such a width that the gas-liquid mixture is induced to flow in a substantially tubular flow regime through the annular throat section.

5. The method of claim 4, wherein one or more flow straightening vanes are arranged in the annular space which vanes induce the gas-liquid mixture to flow in a substantially axial direction through the annular throat section.

6. The method of claim 5, wherein the vortex tube has a trumpet-shaped proximal end which is connected to a fluid inlet tube, such that an annular fluid inlet conduit is formed which co-axially surrounds the wall of the central gas outlet conduit and in which a series of flow-straightening vanes are arranged which induce the fluid mixture to flow in a substantially axial direction into the vortex tube.

7. The method of claim 6, wherein the flow-straightening vanes are arranged in a section of the annular fluid inlet conduit in which the fluid inlet tube has a larger inner diameter than other parts of the fluid inlet tube which vanes induce the fluid mixture to flow at a subsonic velocity through the annular fluid inlet conduit and the gas-liquid mixture is accelerated to a substantially transonic or supersonic velocity in the trumpet-shaped proximal end of the vortex tube.

8. The method of claim 1, wherein a substantially inert gas is injected into the gas-liquid mixture to enhance homogenization of the gas-liquid mixture.

9. The method of claim 1, wherein
the degassed liquid is induced by one or more wings arranged in the vortex tube downstream of the throat section to flow in a swirling motion along the inner surface of the vortex tube in downstream direction from a proximal end towards a distal end of the vortex tube and is discharged via an annular liquid outlet conduit which is arranged co-axially between a bullet-shaped deflection body and the inner surface of the distal end of the vortex tube; and
the gas enriched fraction is induced to flow in a countercurrent swirling motion from a nose section of the bullet-shaped deflection body towards the gas outlet conduit which is arranged co-axially within the proximal end of the vortex tube.

10. The method of claim 9, wherein the bullet-shaped deflection body has a conical nose section and a substantially cylindrical tail section, and the distal end of the vortex tube has an in downstream direction diverging shape.

11. The method of claim 9, wherein the central gas outlet conduit is co-axially arranged around a torpedo-shaped central body having conical nose and tail sections and a substantially cylindrical mid section; and
the gas enriched fraction in the central gas outlet conduit is deswirled by an assembly of flow deswirling vanes which is arranged in the central gas outlet conduit between the outer surface of the central body and the inner surface of the wall of the central gas outlet conduit.

12. The method of claim 11, wherein the central gas outlet conduit has a ring-shaped entrance which performs as a vortex finder for the countercurrent swirling motion of the gas enriched fraction stream around a central axis of the vortex tube, which countercurrent swirling motion is induced at the edge of the nose section of the bullet-shaped deflection body.

13. The method of claim 1, wherein the gas-liquid mixture comprises crude oil as carrier liquid and the gaseous or vaporizable components comprise natural gas or condensates such as methane, ethane, propane, butane and pentane, carbon dioxide or hydrogen sulfide.

14. A cyclonic liquid degassing separator for degassing a fluid mixture comprising a carrier liquid and one or more gaseous or vaporizable components, comprising:

a vortex tube having a throat section in which the fluid mixture is accelerated such that the static pressure of the fluid mixture is decreased and vaporizable components evaporate into a gaseous phase;
one or more swirl imparting vanes for inducing the fluid mixture to swirl within the vortex tube thereby inducing the mixture to be separated by centrifugal forces into a degassed liquid fraction and a gas enriched fraction;
a degassed liquid outlet conduit which is located at or near the outer circumference of the vortex tube for discharging the degassed liquid fraction; and
a gas outlet conduit which is located at or near a central axis of the vortex tube for discharging the gas enriched fraction
wherein the separator further comprises fluid homogenization means for inducing the fluid mixture to flow as a substantially homogeneously dispersed gas-liquid mixture through the throat section; and
that the fluid homogenization means comprise one or more flow straightening vanes for inducing the gas-liquid mixture to flow in a substantially axial direction relative to a central axis of the throat section.

15. The separator of claim 14, wherein said fluid homogenization means comprise turbulence generating means which are configured to induce the gas-liquid mixture to flow in a substantially turbulent flow regime through the throat section.

16. The separator of claim 15, wherein the turbulence generating means comprise a central body which is arranged in the throat section such that the throat section has an annular shape and has such a width that the gas-liquid mixture is induced to flow in a substantially tubular flow regime through the annular throat section.

17. The separator of claim 14, wherein the one or more flow straightening vanes are arranged in the annular space which vanes induce the fluid mixture to flow in a substantially axial direction through the annular throat section.

18. The separator of claim 14, wherein the fluid homogenization means comprise means for injecting a substantially inert gas upstream of the throat section into the fluid mixture to enhance homogenization of the fluid mixture.

19. The separator of claim 14, wherein
the vortex tube comprises a proximal end and a distal end;
the separator comprises one or more swirl imparting vanes for inducing the fluid mixture to flow in swirling motion in downstream direction along the inner surface of the vortex tube from the proximal end towards the distal end of the vortex tube;
the liquid outlet conduit has an annular shape and is co-axially arranged between a bullet-shaped deflection body and the inner surface of the distal end of the vortex tube;
the gas outlet conduit is arranged co-axially within the proximal end of the vortex tube; and
the bullet-shaped deflection body comprises a nose section for inducing the gas enriched fraction to flow in a countercurrent swirling motion the nose section of the bullet-shaped deflection body towards the gas outlet conduit.

20. The separator of claim 19, wherein the bullet-shaped deflection body has a substantially cylindrical tail section and the distal end of the vortex tube has an in downstream direction diverging shape.

21. The separator of claim 19, wherein the central gas outlet conduit is co-axially arranged around a torpedo-shaped central body having conical nose and tail sections and a substantially cylindrical mid section; and an assembly of flow deswirling vanes is arranged in the central gas outlet conduit between the outer surface of the central body and the inner surface of the wall of the central gas outlet conduit for deswirling the gas enriched fraction in the central gas outlet conduit.

22. The separator of claim 14, wherein the vortex tube has a trumpet-shaped proximal end which is connected to a fluid inlet tube, such that an annular fluid inlet conduit is formed which co-axially surrounds the wall of the central gas outlet conduit and in which vortex tube a series of swirl-imparting vanes are arranged which induce the fluid mixture to flow in a swirling motion through at least part of the vortex tube.

23. The cyclonic separator of claim 14, wherein the degassed liquid outlet conduit is connected to a gravity separation assembly comprising mechanical weirs under and over flow systems for separating the oil, water and residual gas discharged by the degassed liquid outlet conduit.

* * * * *